United States Patent [19]
Paterson et al.

[11] Patent Number: 5,454,302
[45] Date of Patent: Oct. 3, 1995

[54] PEAR TRANSFER APPARATUS AND METHOD

[75] Inventors: Douglas F. Paterson; Noah P. Forden, both of Colorado Springs, Colo.

[73] Assignee: Atlas Pacific Engineering Company, Pueblo, Colo.

[21] Appl. No.: 205,310

[22] Filed: Mar. 2, 1994

[51] Int. Cl.⁶ .................................................. B65G 47/24
[52] U.S. Cl. .......................... 99/584; 99/549; 198/383; 198/394
[58] Field of Search ................ 99/584, 549, 550; 198/394, 382, 383, 389, 390

[56] References Cited

U.S. PATENT DOCUMENTS 3,058,502  10/1962  Loveland et al. ............... 99/542 X
3,797,639   3/1974  Smith ............................. 198/394
4,487,307  12/1984  Meissner et al. ............... 198/394
4,766,990   8/1988  Colombo ......................... 198/383
4,907,687   3/1990  Meissner et al. ............... 198/394

Primary Examiner—David Scherbel
Assistant Examiner—Patrick F. Brinson
Attorney, Agent, or Firm—Bruce H. Johnsonbaugh

[57] ABSTRACT

An apparatus and method are provided for moving a pear from a roll orientor into a transfer cup wherein an inclined pear stop shoe is provided which contacts and guides the pear downwardly into the transfer cup as the orienting rolls separate. The rolls are separated at a predetermined speed so that the roll maintains contact with the pear and helps guide the pear into the transfer cup. The pear stop shoe is retractable after the pear is guided into the transfer cup so that the pear is supported only by the walls of the transfer cup.

4 Claims, 7 Drawing Sheets

PEAR TRANSFER APPARATUS AND METHOD

BRIEF SUMMARY OF THE INVENTION

This invention relates generally to pear processing machines. More particularly, the invention relates to an improved method and apparatus for moving pears from a roll orientor into a transfer cup. The roll orientor is as shown in application Ser. No. 08/035,667 filed Mar. 23, 1993 and entitled "Pear Processing Method and Apparatus," owned by the assignee of this application. The apparatus of that application includes a pear orienting mechanism which receives singulated pears from a feeder and tumbles the pears on orienting rolls until the stems are pointing downwardly. That apparatus also includes a transfer cup having a somewhat different design from the preferred transfer cup design used in the present invention. The apparatus of Ser. No. 08/035,667 moves the pears from the rolls to the transfer cup by abruptly separating the rolls and abruptly moving a pear stop out of contact with the pear. The pear then free-falls into the transfer cup. That mechanism would occasionally allow the free-falling pear to become misoriented.

The point of the present invention is to provide an improved apparatus and method for continuously guiding the oriented pears downwardly from the roll orientor into the transfer cup while preserving the stem-down orientation of the pear. The pears do not free-fall into the transfer cup.

Accordingly, a primary object of the invention is to provide an apparatus and method for guiding pears from a roll orientor into a transfer cup while continuously preserving the stem-down orientation of the pears.

A further object of the invention is to provide a pear stop shoe which extends downwardly from one of the rolls of the roll orientor into the transfer cup so that, as the rolls are separated at a controlled speed, the oriented pear slides downwardly into the transfer cup and, as it slides, it contacts both the pear stop shoe and one of the rolls.

A further object of the invention is to provide a method for moving the pears from a roll orientor into a transfer cup located beneath the roll orientor wherein the rolls are separated at a predetermined rate and the pears are guided downwardly into the transfer cup by sliding against a pear stop shoe and simultaneously sliding against one of the rolls as the rolls separate.

Other objects and advantages of the invention will become apparent from the following description of the preferred embodiments and the drawings wherein:

DETAILED DESCRIPTION OF THE DRAWINGS

Figure 1:
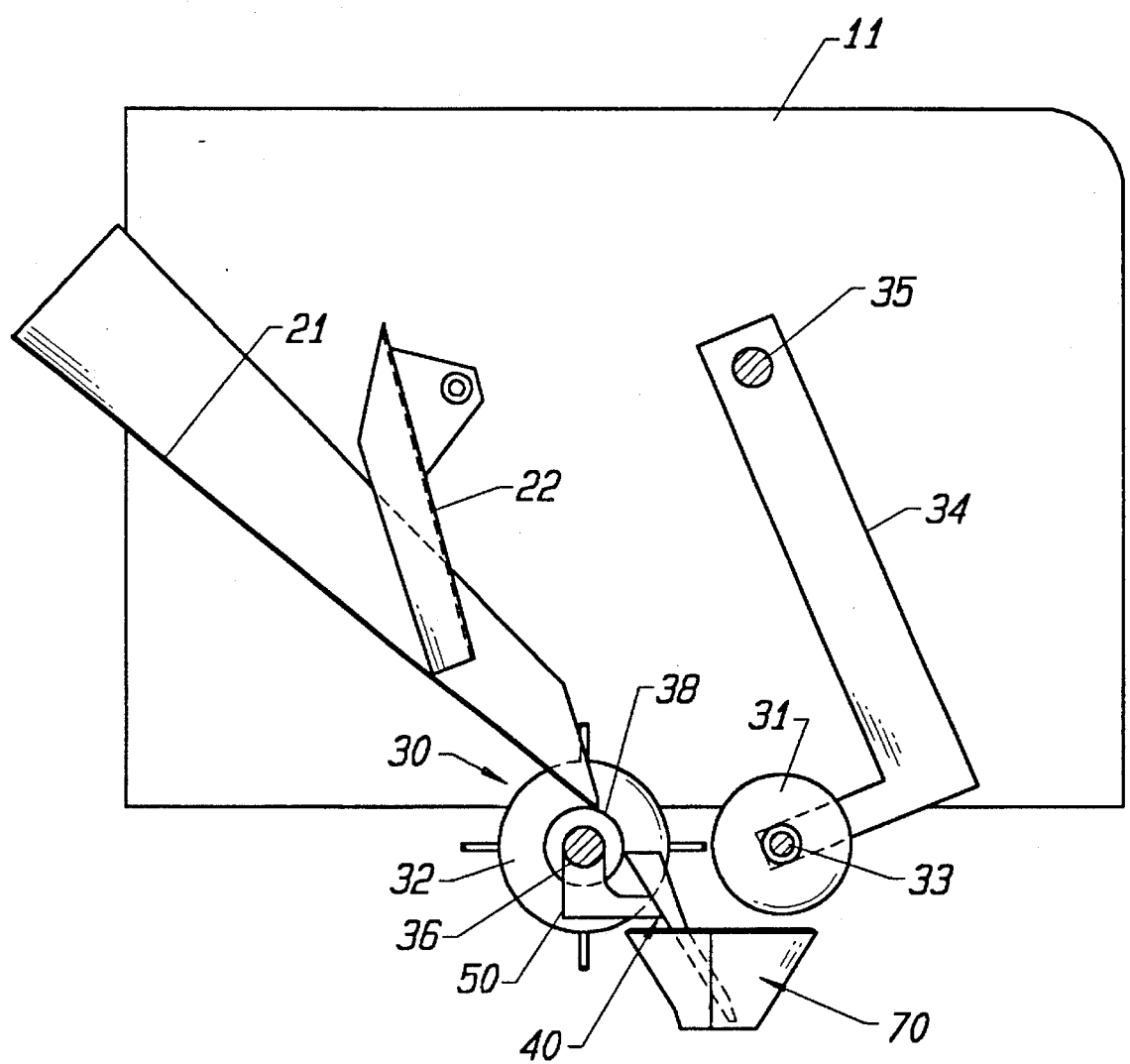
FIG. 1 is a side elevational view of a roll orientor, transfer cup and pear stop shoe according to the present invention.
Figure 2:
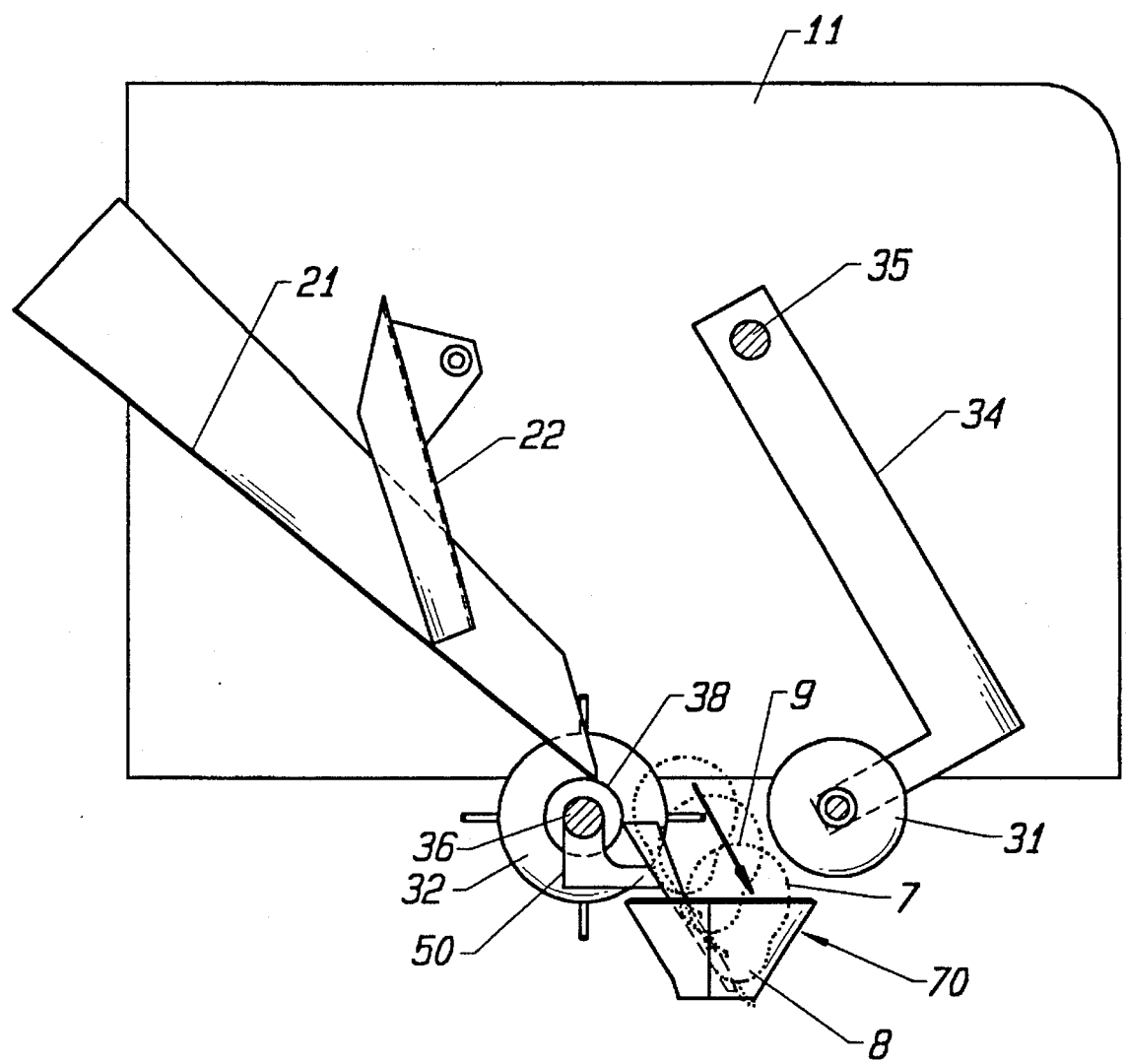
FIG. 2 is a side elevational view of the apparatus of FIG. 1 wherein the rolls are separating and a pear is sliding downwardly into the transfer cup.

Referring to FIGS. 1–5, a roll orientor shown generally as 30 includes a front orienting roll 31 and a rear orienting roll 32, the purpose of which is to tumble a pear 7 until its stem end 8 is pointed downwardly as shown in FIG. 2 and its blossom end 9 is oriented in an upward direction. The operation of the roll orientor 30 is shown and described in greater detail in application Ser. No. 08/035,667 filed Mar. 23, 1993 and entitled "Pear Processing Method and Apparatus," owned by the assignee of this application.

Pears are fed onto chute 21 singularly and are stopped at gate 22. Gate 22 opens to allow a pear to tumble downwardly onto orienting rolls 31 and 32. The pears are tumbled between rolls 31 and 32 until the stem is oriented downwardly and the blossom end 9 is oriented upwardly as shown in FIG. 2.

The front orienting roll 31 is carried by an L-shaped frame 34. Roll 31 rotates about shaft 33 carried by frame 34. L-shaped frame 34 articulates about a mounting shaft 35 carried by the frame 11 of the apparatus. The L-shaped frame 34 may pivot around shaft 35 in the direction shown by arrow 39 in FIG. 3.

Figure 3:
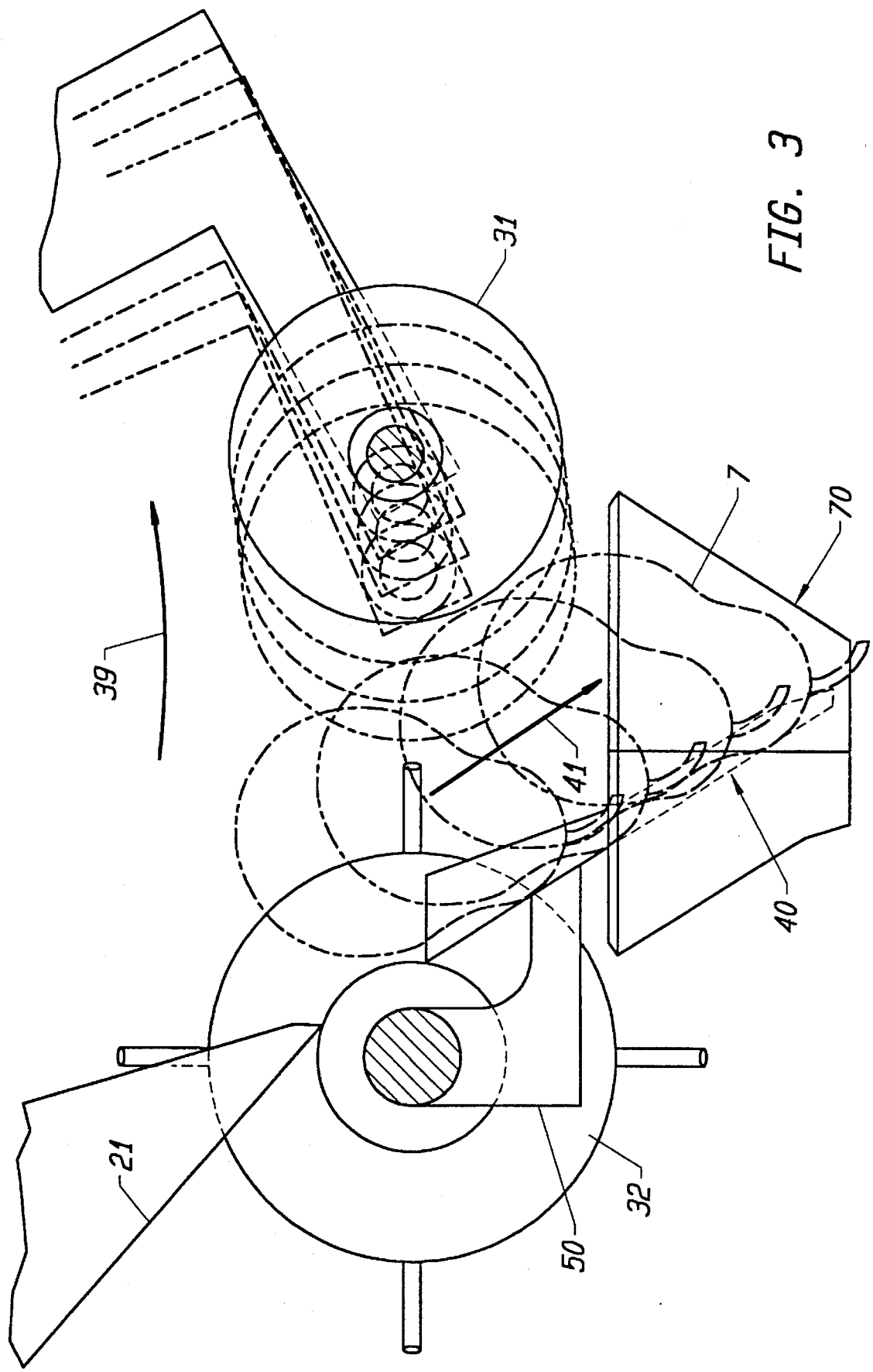
FIG. 3 is a schematic representation of a portion of the apparatus shown in FIG. 2 showing the motion of the pear downwardly as the rolls separate.

Rear orienting roll 32 rotates on shaft 36. Rolls 31 and 32 form a pair of rolls mounted for rotation upon spaced horizontal axes formed by shafts 33 and 36. Once the pear is oriented with its stem pointing downwardly, rolls 31 and 32 are separated at a predetermined rate by the motion of frame 34 about shaft 35 which causes roll 31 to move in the direction of arrow 39 (FIG. 3). As the rolls 31 and 32 separate, pear 7 moves downwardly between the rolls as shown best in FIG. 3.

A pear stop shoe means shown generally as 40 is carried by shaft 36 which supports the rear roll 32. The pear stop shoe means 40 extends downwardly from roll 32 into the transfer cup 70. The pear stop shoe means 40 is inclined at an approximately 30° angle to the vertical, so that the pear 7 will slide downwardly between the pear stop shoe means 40 and the front roll 31, as shown in FIGS. 2 and 3. As the pear 7 moves downwardly along the path of the arrow 41, it is contacted and guided on one side by the pear stop shoe means 40 and on the opposite side by front roll 31. The continuous contact on both sides of pear 7 retains the stem downward orientation as the pear moves downwardly into transfer cup 70.

Figure 6:
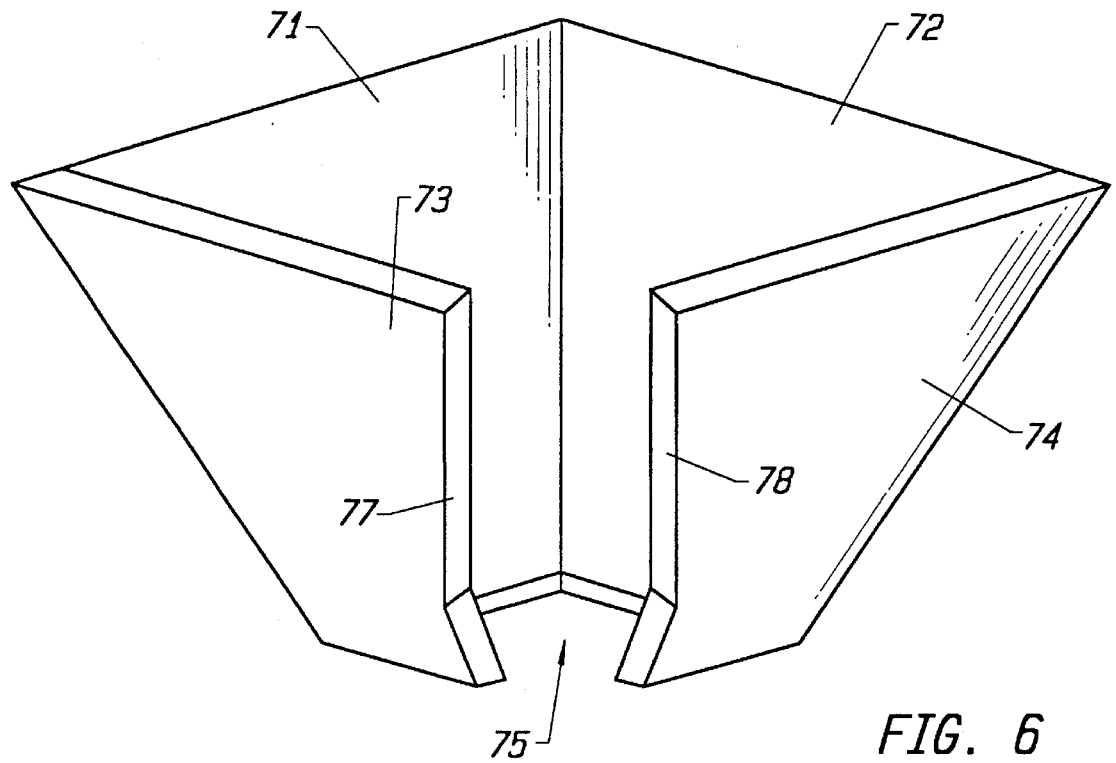
FIG. 6 is a perspective view of the transfer cup.
Figure 7:
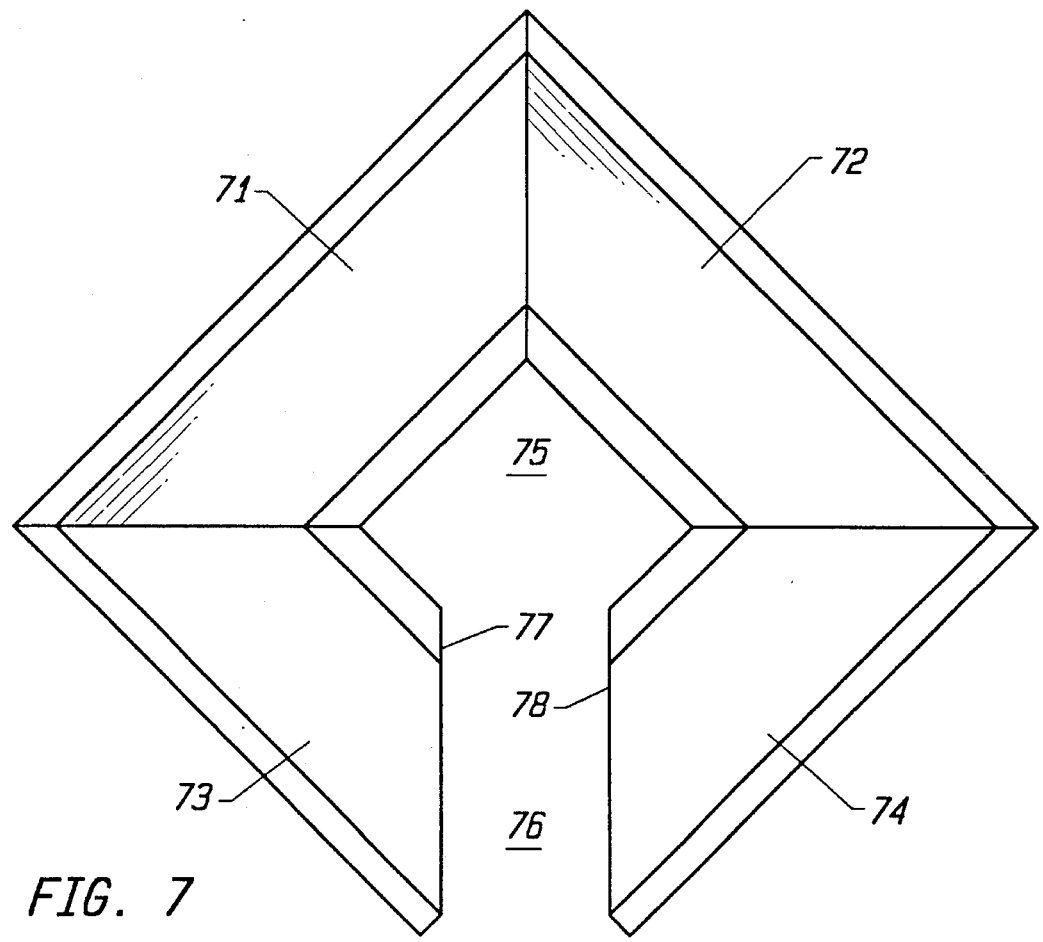
FIG. 7 is a plan view of the apparatus shown in FIG. 6.
Figure 8:
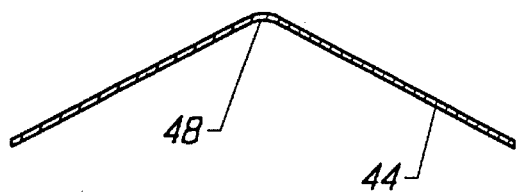
FIG. 8 is a sectional view of the upper portion of the stop shoe.
Figure 9:
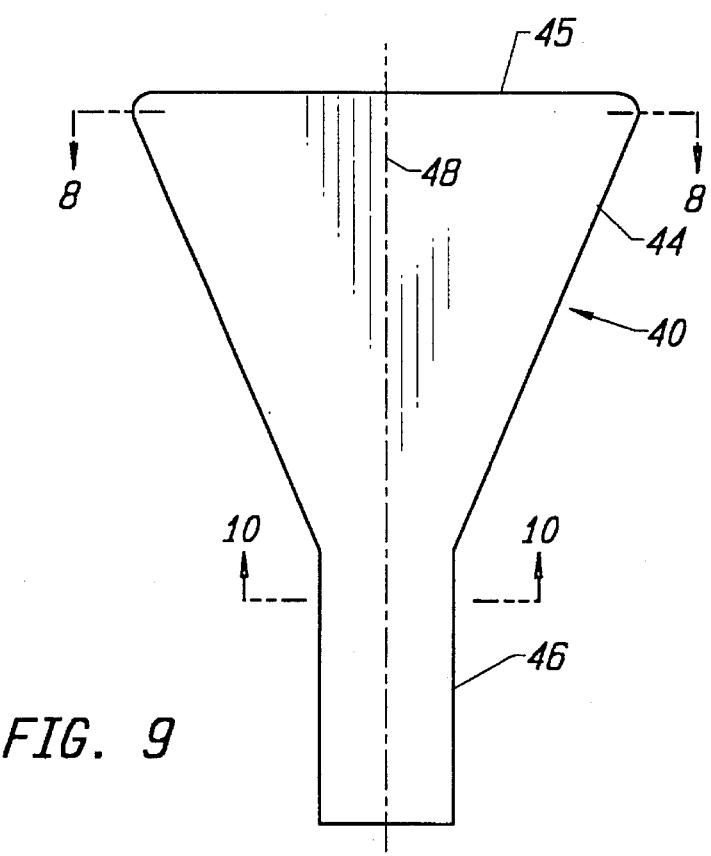
FIG. 9 is a plan view of the stop shoe.
Figure 10:
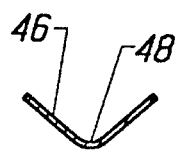
FIG. 10 sectional view of the lower portion of the stop shoe.
Figure 11:
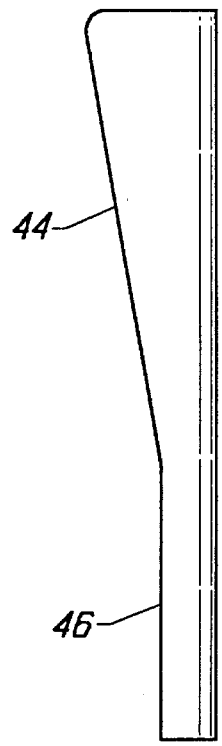
FIG. 11 is a side view of the pear stop shoe.

As the pear enters transfer cup 70, as shown best in FIG. 3, it moves downwardly onto the front portion of the transfer cup and contacts the front walls 71 and 72 (FIGS. 6 and 7).

Figure 4:
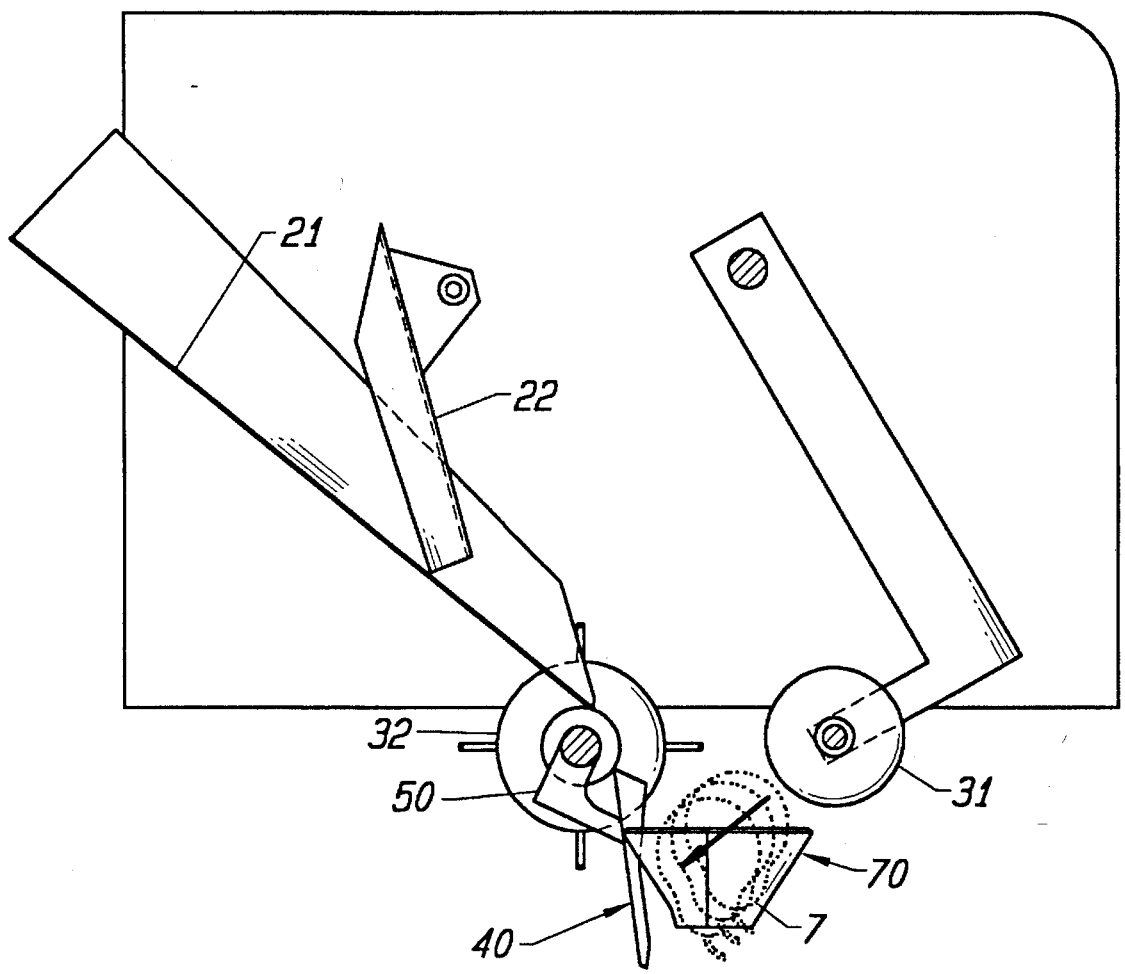
FIG. 4 is a side view of the apparatus shown in FIGS. 1 and 2 after the stop shoe has been retracted, showing the motion of the pear as it is centered in the transfer cup.
Figure 5:
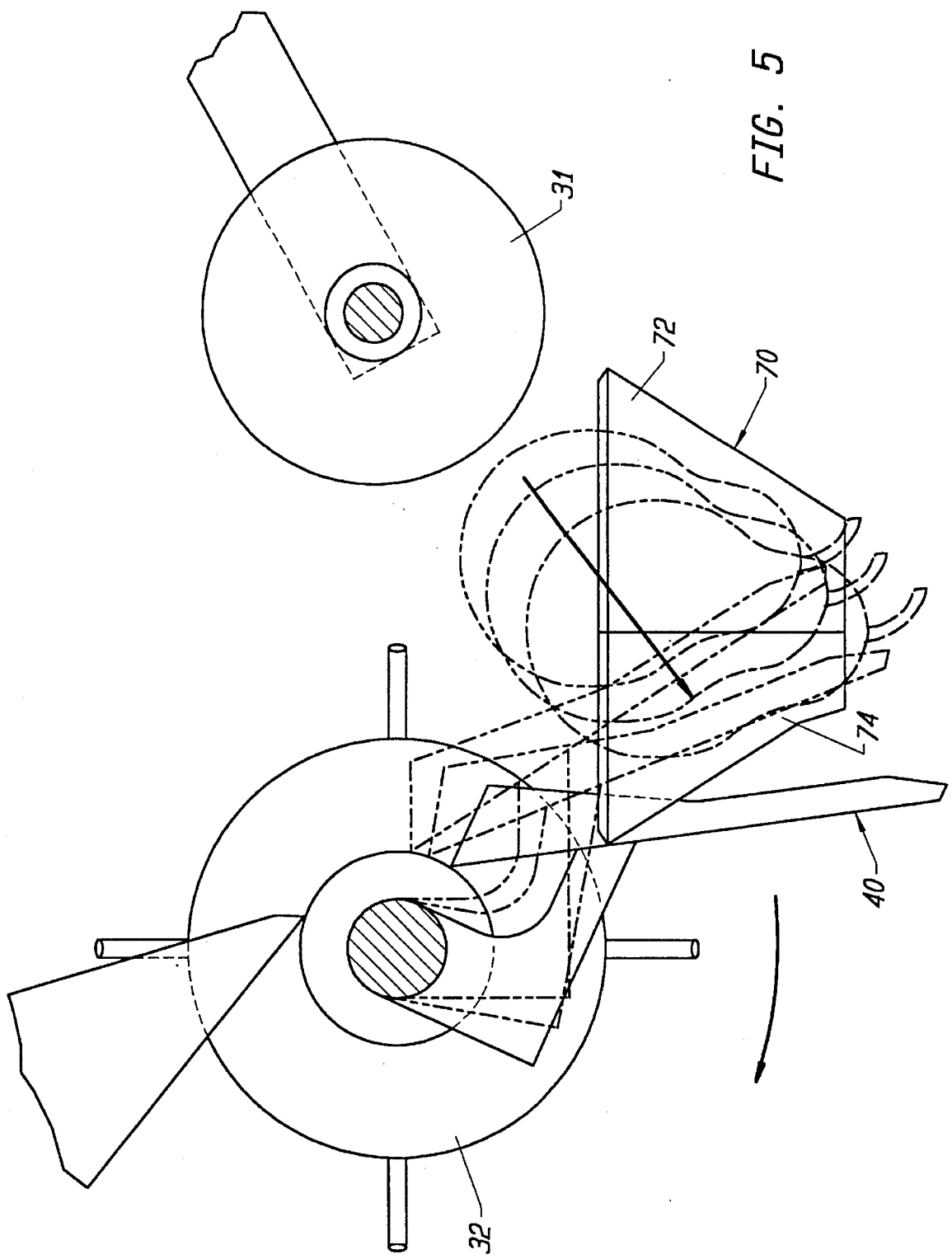
FIG. 5 is a schematic representation of the motion of the pear being centered in the transfer cup as the stop shoe is retracted.

After pear 7 has moved to its position shown in FIG. 3, where it is resting against the front two walls of the transfer cup, the pear stop shoe means 40 is retracted to the position shown in FIG. 4, allowing the pear 7 to move downwardly to a position where it contacts the rear walls 73 and 74 of transfer cup 70 (FIGS. 6 and 7). After the pear has moved in this fashion in transfer cup 70, it is centered within transfer cup 70 in a stem downward orientation and supported only by the four walls 71–74.

As shown in FIGS. 6 and 7, transfer cup 70 has the shape of an inverted and truncated pyramid. Front walls 71 and 72 and rear walls 73 and 74 slope downwardly and inwardly, forming a bottom opening 75 adapted to receive and support the stem 8 of pear 7. A channel 76 is formed between the edges 77 and 78 of rear walls 73 and 74, respectively, to allow the pear stop shoe means 40 to move laterally into and out of transfer cup 70. Front walls 71 and 72 are positioned at a 45° angle relative to the path followed by the pear stop shoe means 40 as it is retracted through channel 76. This positioning of walls 71 and 72 provides a three point landing for pear 7 as it slides into the transfer cup 70; the three points of support being the two front walls 71 and 72, and the stop shoe 40. Although FIGS. 6 and 7 show the preferred embodiment of transfer cup, alternate designs and positionings of transfer cup 70 may be utilized without departing from this invention.

FIGS. 8–11 show the configuration of the surface of the pear stop shoe means against which the pears slide. The upper portion 44 of the pear stop shoe means 40 is a generally triangular shaped, inclined surface which is roughly three times as wide at its upper end 45 as at its lower end 46. It has a generally V-shaped cross-section, shown best in FIG. 8, where the stem of the pear tends to slide against the apex of the V which forms the vertical centerline 48 of the stop shoe 40. The centerline 48 is radiused to accommodate the curvature of the stem end of the pear. The lower portion 46 of the stop shoe is relatively narrow with a V-shaped cross-section shown in FIG. 10. The lower portion 46 is narrow enough to pass through the opening 76 formed between rear walls 73 and 74 of transfer cup 70 as shown best in FIG. 7. The stop shoe 40 forms an inclined guide chute extending from the roll orientor 32 to the transfer cup 70.

The surface formed by the centerline 48 of the stop shoe means 40 is tangential to the surface 38 of rear roll 32 against which the pear rolls. The pear stop shoe means 40 is connected to shaft 36 by a generally L-shaped frame 50. The stop shoe frame 50 is movable between a first position shown in FIG. 3 in which it supports the stop shoe 40 in a position where the stop shoe 40 extends downwardly into transfer cup 70 at approximately a 30° angle to the vertical and a second, retracted position, shown in FIG. 4, in which the lower portion of stop shoe 40 is moved laterally out of transfer cup 70 and extends in approximately a vertical direction. The stop shoe 40 therefore moves approximately 30° between its first position in which it guides the pear downwardly into the transfer cup and its second position in which it is retracted to allow the pear to become centered in the transfer cup.

What is claimed is:

1. In a pear orienting apparatus having a set of orienting rolls including at least a pair of rolls mounted for rotation upon spaced horizontal axes wherein said pair of rolls tumbles a pear until the stem of said pear is pointed downwardly, the improvement comprising:

a transfer cup located beneath said pair of rolls, means for separating said pair of rolls at a predetermined speed after a pear has been oriented between said rolls with its stem pointing downwardly, and pear stop shoe means extending downwardly from one of said rolls into said transfer cup, wherein said pear stop shoe means is movable between a first position in which it extends downwardly from said roll at an angle of approximately 30° to the vertical and a second, retracted position in which it extends downwardly in an approximately vertical direction, and whereby as said rolls separate, the oriented pear moves downwardly into said transfer cup, said pear retaining its stem-downward orientation by sliding between and contacting both said pear stop shoe means and one of said rolls as it moves into said transfer cup.

2. The apparatus of claim 1 wherein said pear stop shoe means is movable between a first position wherein it extends into said transfer cup and a second, retracted position wherein its lower portion is withdrawn laterally out of said transfer cup.

3. The apparatus of claim 1 wherein said transfer cup has the shape of an inverted, truncated pyramid, including two front walls and two rear walls, and wherein said pear stop shoe means is movable between a first position in which a pear is supported by said two front walls and said stop shoe means and a second position wherein said pear is supported only by said front and rear walls of said transfer cup.

4. A method for orienting pears into a position wherein the stem ends extend downwardly beneath the blossom ends and wherein the pear is held in a stem-downward orientation in a transfer cup, wherein said transfer cup has the shape of an inverted and truncated pyramid and two front walls and two rear walls, and wherein a pear stop shoe extends through a channel between said rear walls into said transfer cup, and said pear stop shoe is retractable to a position outside said transfer cup, comprising the steps:

tumbling each pear between a pair of rolls rotating about spaced horizontal axes until the stem end of each pear extends downwardly between said pair of rolls, separating said pair of rolls at a predetermined rate, guiding said pear downwardly into said transfer cup by a pear stop shoe, said pear sliding on said pear stop shoe and retaining its stem-downward orientation, simultaneously and continuously guiding said pear into said transfer cup by contacting said pear with one of said pair of rolls as said rolls separate, guiding said pear downwardly against the front two walls of said transfer cup, and retracting said pear stop shoe and allowing said pear to move downwardly against the rear two walls of said transfer cup to a position wherein said pear is supported in a stem-downward orientation by all four walls of said transfer cup.

* * * * *